United States Patent [19]

Kanodia

[11] Patent Number: 4,684,166
[45] Date of Patent: Aug. 4, 1987

[54] VEHICLE DOOR IMPACT BEAM AND STABILIZING ASSEMBLY

[75] Inventor: Vinod L. Kanodia, Rochester, Mich.

[73] Assignee: General Motors Corporation, Detroit, Mich.

[21] Appl. No.: 864,304

[22] Filed: May 19, 1986

[51] Int. Cl.⁴ ............................................. B60J 5/04
[52] U.S. Cl. ..................................... 296/146; 296/188; 296/30
[58] Field of Search ................. 49/501, 502; 296/146, 296/188, 189, 30; 256/13.1

[56] References Cited

U.S. PATENT DOCUMENTS

| 3,964,208 | 6/1976 | Renner et al. ............... | 49/374 X |
|---|---|---|---|
| 4,013,317 | 3/1977 | Reidelbach et al. ............... | 296/146 |
| 4,056,280 | 11/1977 | Bauer et al. ............... | 49/502 X |
| 4,090,734 | 5/1978 | Inami et al. ............... | 296/146 |
| 4,290,641 | 9/1981 | Miyauchi et al. ............... | 296/146 |
| 4,306,381 | 12/1981 | Presto ............... | 49/502 |
| 4,328,642 | 5/1982 | Presto ............... | 49/502 |

FOREIGN PATENT DOCUMENTS

| 2250908 | 5/1973 | Fed. Rep. of Germany ...... | 293/120 |
|---|---|---|---|
| 0050813 | 5/1981 | Japan ............... | 296/188 |

Primary Examiner—Robert B. Reeves
Assistant Examiner—Russell D. Stormer
Attorney, Agent, or Firm—William A. Schuetz

[57] ABSTRACT

An impact beam assembly for a side door of a vehicle comprising a metal beam having a hat shaped, double hat shaped or I-shaped cross-section and a stabilizing strap is disclosed. The metal beam has a pair of vertically extending flanges and the stabilizing strap extends along a midportion of the beam and has its upper and lower sides crimped over the back side of the flanges of the beam.

4 Claims, 6 Drawing Figures

VEHICLE DOOR IMPACT BEAM AND STABILIZING ASSEMBLY

The present invention relates to a vehicle impact beam assembly and, more particularly, to an impact beam assembly for use in a side door of an automotive vehicle.

Heretofore, impact beams and assemblies have been provided for use in side doors of automotive vehicles. These assemblies have included structural steel members extending between the fore and aft vertically extending walls of a vehicle door. These structural steel members are usually stamped from sheet metal to various cross sectional configurations, including hat shaped or corrugated configurations. In some cases, reinforcement plates are welded to the beam and/or any voids therein are filled with foam materials, etc., although this usually increases the weight and/or cost of the vehicle door. Examples of such side door impact beam assemblies are shown in U.S. Pat. Nos. 3,964,208; 4,013,317 and 4,090,734.

In addition, federal vehicle safety standards specify that side door impact beam assemblies have to meet certain load or energy absorbing criteria for a specified lateral displacement of the door in response to a automotive vehicle being subjected to a lateral impact. While known side door impact beam assemblies used in vehicles produced in the United States, including those produced by the assignee of the present invention, have been satisfactory in use and have met these federal safety standards, there is, nevertheless, an effort to reduce the mass and/or cost of these assemblies without sacrificing the required protection or energy-absorbing capabilities of these impact beam assemblies upon the vehicle being subjected to lateral impacts.

In accordance with the provisions of the present invention, a new and improved door impact beam assembly for a side door of a vehicle is provided which comprises a metal member stamped or roll formed to provide a hat, double hat, or I-shaped structural member having a pair of vertically extending flanges located adjacent the inner or outer panel of the door and which includes a stabilizing strap extending fore and aft of the structural member a predetermined distance from its mid-portion and which has upper and lower sides or ends crimped over the backside of the flanges on the structural member, and wherein the strap is slidable relative to the structural steel member during a side impact which causes the structural steel member to be bowed inwardly of the door to substantially prevent the flanges of the structural member from deforming or curling whereby the load bearing capability of the impact beam assembly is enhanced as compared to an identically shaped structural member without the stabilizing strap.

Accordingly, a broad object of the present invention is to provide a new and improved door impact beam assembly for a vehicle side door and wherein the door impact beam assembly is of a relatively simple construction, relatively lightweight, can be easily designed to fit any door, is of relatively low cost and low mass and whose performance is not very sensitive to manufacturing or tolerance variations.

Another object of the present invention is to provide a new and improved door impact beam assembly for use in a vehicle side door which comprises a structural metal beam stamped from sheet metal, or roll formed, and provided with upper and lower vertically extending flanges located adjacent the outer door panel of the door, and which includes a stabilizing strap extending along the structural beam from its midportion a predetermined length fore and aft of the beam and whose upper and lower ends are crimped over the backside of the upper and lower flanges of the structural steel beam, and wherein the stabilizing strap can slide relative to the flanges on the steel beam as the latter is bowed inwardly upon being subjected to a lateral side impact force to substantially prevent the flanges of the steel beam from deforming or curling over, whereby the load bearing ability of the steel beam is significantly enhanced as compared to an identically shaped steel beam without the stabilizing strap.

A more specific object of the present invention is to provide a new and improved door impact beam assembly, as defined in the next preceding object, and wherein the stabilizing strap is tack welded at just one longitudinal location at or adjacent the center of the strap to the structural steel beam to prevent rattling thereof during normal use of the vehicle.

A further object of the present invention is to provide a new and improved door impact beam assembly for use in the vehicle side door, as defined in the preceding objects, and wherein the structural steel beam has a cross sectional configuration which is hat shaped and wherein the stabilizing strap functions to substantially maintain the cross sectional shape of the hat shaped structural steel beam during inward bowing movement of the latter due to deformation caused by a lateral side impact to the door of the vehicle.

Yet another object of the present invention is to provide a new and improved door impact beam assembly for use in the vehicle side door, as defined in the preceding object, and wherein the structural steel beam is corrugated or double hat shaped in cross section.

A further object of the present invention is to provide a new and improved door impact beam assembly for use in the vehicle side door and wherein the structural steel member is I-shaped in cross sectional configuration and preferably comprises either a pair of U-shaped stamped steel members having their bottoms welded together back to back or a hot rolled metal beam.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which.

Figure 1:
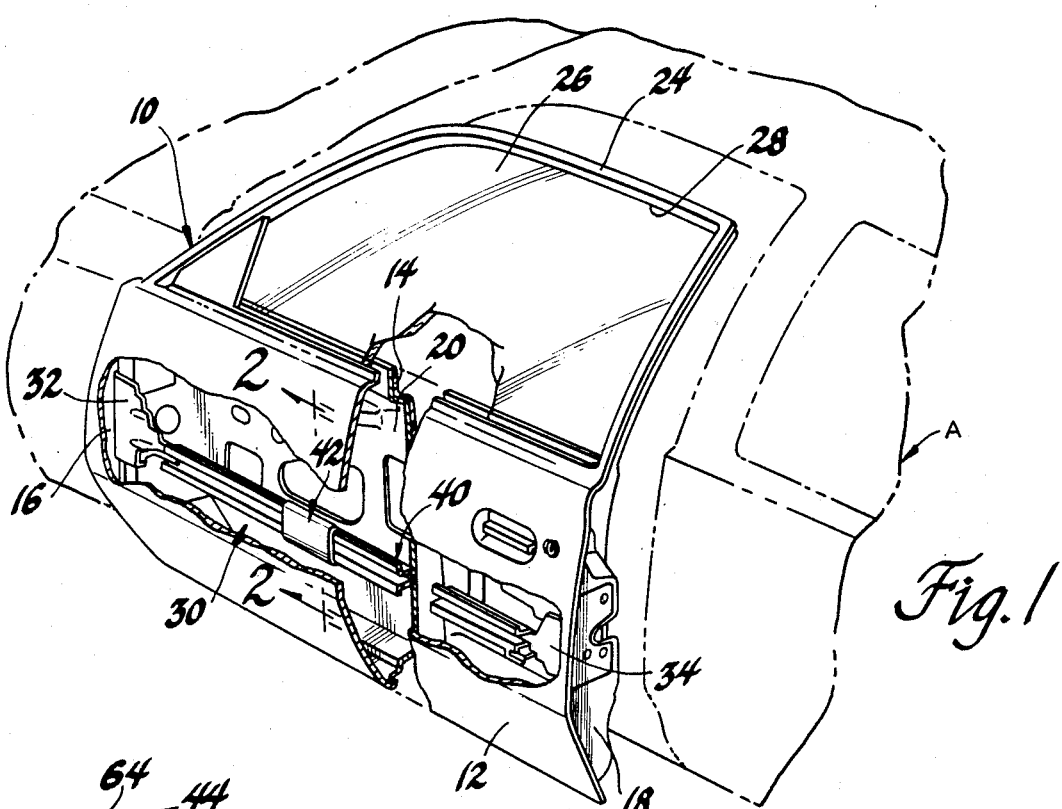
FIG. 1 is a fragmentary perspective view of a vehicle door incorporating a novel side door impact beam assembly of the present invention.

Referring to FIG. 1 of the drawings, an automotive vehicle A, shown in phantom lines, is thereshown. The vehicle A includes a vehicle door or door means 10, hereshown as a front door, which is adapted to be hingedly connected at its forward end to the vehicle A at its A pillar via suitable or conventional hinge means (not shown) for movement between an open position in which occupant entry is permitted into the vehicle and a closed position.

The vehicle door or door means 10, comprises an outer sheet metal panel 12, an inner sheet metal panel 14, and metal front and rear end walls 16 and 18 respectively, to which the outer and inner panels 12 and 14 are welded or otherwise suitably secured. The outer panel 12, the inner panel 14 and the end walls 16 and 18 define a door well or opening 20 therebetween. The door 10 also includes an upper integral frame means 24 defining side channels for slidably receiving a window 26 along its side edges for movement between an upper position, as shown in FIG. 1, in which it closes a window opening 28 in the door frame 24 and in the open position in which the window 26 is wholly disposed within the door well 20. The window 26 is suitably guided between its open and closed positions within the channels of the frame means 24 by a suitable or conventional guide and sealing means (not shown), as is well known to those skilled in the art. The window 26 is adapted to be moved between its open and closed positions by a suitable or conventional window regulator mechanism (not shown) suitably connected with its bottom edge.

In accordance with the provisions of the present invention, a novel side door impact beam assembly 30 is provided. The door impact beam assembly 30 extends longitudinally of the vehicle, is horizontally disposed within the door well 20 and has its opposite ends secured to the end walls 16 and 18 of the vehicle door means 10.

Figure 2:
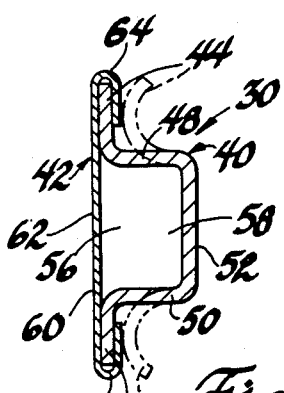
FIG. 2 is an enlarged sectional view taken approximately along line 2—2 of FIG. 1.

The side door impact beam assembly 30 comprises fore and aft structurally reinforced steel end plates 32 and 34 which are suitably secured to the fore and aft walls 16 and 18, respectively, of the door means 20 by any suitable means, such as being bolted or welded thereto. The door impact assembly 30 further comprises, in their preferred embodiment, as shown in FIGS. 1 and 2, a structural metal beam member 40 and a stabilizing strap 42. Although the structural metal beam member 40, in the preferred embodiment, will be described as being made from steel, it should be understood that it could be made from any high strength material, such as aluminum, composite materials, etc.

As shown in FIG. 2, the structural steel beam member 40 comprises a one-piece flat sheet steel member which is suitably stamped or roll formed to a hat shaped configuration. The one-piece hat shaped structural steel member 40 comprises upper and lower vertically extending flanges 44 and 46, respectively, upper and lower lateral or horizontally extending portions 48 and 50, respectively, and a vertically extending bottom or bridge portion 52 extending between the lateral portions 48 and 50. The hat shaped structural steel member 40 has an open side 56 and defines a horizontally extending void or recess 58. The hat shaped structural steel member 40 at its forward and aft ends is suitably connected or welded to the end plates 32 and 34 so that, in the preferred embodiment, the open side 56 thereof faces towards the outer panel 12 of the door 10. The open side 56 could face the inner panel 14, if desired.

The side door impact beam assembly 30 further includes the stabilizing strap 42, which is made from sheet steel and has a thickness approximately one half the thickness of the structural beam 40. The stabilizing strap 42 is of one-piece and comprises a main body portion 62 which extends across the opening 56 in the structural beam member 40 and a pair of upper and lower ends or flanges 64 and 66, respectively, which abut the side of the flanges 44 and 46 adjacent the opening 56 and which are bent and crimped over the flanges 44 and 46 so as to also be in engagement with the backsides thereof, as clearly shown in FIG. 2. The stabilizing strap 42 is secured to the midportion of the hat shaped structural beam 40 so that it extends an equal distance fore and aft along the structural steel member 40 from the horizontal midportion of the structural beam 40. It extends along for only a portion of the length of the structural steel member 40, preferably approximately 250 millimeters. In. addition, the steel strap 42 has its flanges 64 and 66 tack welded at preferably only one location at the center of the strap 42 to the flanges 44 and 46, respectively, of the structural steel member 40 to hold the same in place during normal use of the vehicle and to prevent rattling of the strap relative to the structural steel beam 40.

The steel strap 42 functions to stabilize the configuration of the structural steel member 40 and enhance the capability of the structural steel member 40 to absorb energy upon the latter being bowed inwardly in the event of a side impact to the side door 10 of the vehicle. During any side impact against the side door beam assembly 30, the steel strap 42, slides relative to or over the steel beam 40 as the latter is deformed or bowed inwardly. This sliding or relative movement prevents large compressive bending stresses from developing in the strap 42 because the strap 42 can bend about its own neutral axis. For the flanges 44, 46 to buckle or curl when under compression loads due to a side impact, they have to stretch the strap 42 in a manner like stretching a membrane. However, since the strap 42 is stiff and strong in membrane behavior (in resisting stretching), it stabilizes the flanges 44, 46 against buckling and/or curling due to yielding. Thus the stabilizing strap 42, as the structural beam 40 is being bowed inwardly, prevents or substantially prevents the flanges 46 and 44 and main body portion of the beam 40 from curling or bowing inwardly of the vehicle toward the dotted line position shown in FIG. 2 adjacent the areas of lateral impact upon the beam 40. That is, without the stabilizing strap 42, the forces exerted against the beam 40 bowing the same inwardly of the vehicle would cause the flanges 44 and 46 and the lateral portions 48 and 50 to yield and curl or tend to fold outwardly, as indicated by the dotted lines in FIG. 2. However, with the presence of the stabilizing strap 42, and its ability to slide relative to or over the beam 40, this curling or outward bowing of the structural beam 40 is minimized or greatly inhibited with the result that the impact beam assembly 30 is capable of sustaining higher loads and absorbing increased energy for a given deformation or displacement, as compared to an identical impact beam 40 without the stabilizing strap 42.

From the foregoing, it should be apparent that the load absorbing capabilities of the hat shaped structural member 40 can be enhanced by the use of the stabilizing strap 42 as compared to the identical shaped structural beam 40 without a stabilizing strap. The advantages of the use of the stabilizing strap 42 in conjunction with the structural beam 40 is that a lower mass structural hat shaped beam 40 can be used which will equal in sustaining load and energy absorbing capability the use of a much larger mass hat shaped structural beam 40. Moreover, a reduction in the mass of the structural beam 40 results in a reduction in cost of the beam. Another advantage is that with the construction shown in FIG. 2, the load-displacement curve of the beam assembly 30 upon being bowed inwardly will be or substantially will be square shaped which optimizes the load absorbing capabilities of the beam assembly.

Figure 3:
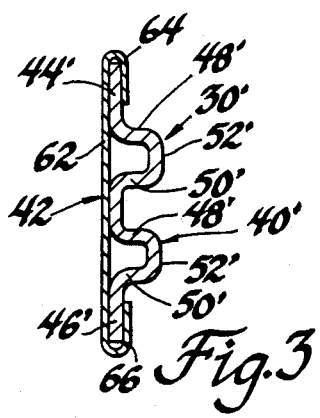
FIG. 3 is an enlarged cross sectional view of a second embodiment of the side impact door beam assembly of the present invention.

FIG. 3 shows second an embodiment of a novel side door guard beam assembly 30' of the present invention, and in which the same reference numerals with a prime affixed thereto are used to designate parts which are the same or similar to the parts of the side door guard beam assembly 30 of the FIG. 2 embodiment. The FIG. 3 embodiment is the same as the preferred embodiment shown in FIG. 2 except that a double hat or corrugated cross sectional shape 40' is employed for the structural beam 40. By employing a double hat section the depth of the corrugations, as measured from the stabilizing strap 42' to the bottom 52' of the corrugation can be made of a lesser depth than that shown in the FIG. 2 embodiment. In all other respects, FIG. 3 embodiment functions and operates in substantially the same way as that previous described in connection with the embodiment of FIG. 2.

Figure 4:
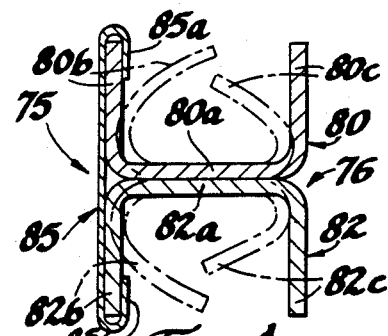
FIG. 4 is an enlarged sectional view of a third embodiment of the novel side door impact beam assembly of the present invention.

FIG. 4 shows a third embodiment of the novel side door guard beam assembly 75. In this embodiment, the structural beam 76 is I-shaped and comprises a pair of U-shaped beams 80 and 82, as viewed in cross section in FIG. 4. The U-shaped beams 80 and 82 have their bottoms 80a and 82a generally horizontally disposed and located in abutting engagement with each other to provide an I-shaped overall cross-sectional configuration. The U-shaped beams are secured together by welding or other suitable means, e.g., riveting, the bottoms 80a, 82a together. The U-shaped beams 80, 82 have their side flanges 80b and 80c and 82b and 82c generally vertically disposed. The side flanges 80b and 82b are located adjacent the outer door panel 12 of the door assembly 10 and are secured to the stabilizing strap 85, which is identical in construction to the previously described stabilizing strap 42. The stabilizing strap 85 extends across the outer sides 80b and 82b of the U-shaped sections 80 and 82, respectively, and has its upper and lower flanges 85a and 85b crimped over and into engagement with the backsides of the side flanges 80b and 82b.

As best shown in FIG. 4, the flanges 80b and 82b of the U-shaped structural beams 80 and 82, if the beams 80 and 82 are not provided with any stabilizing strap 85, and if used as a side door guard beam, when deformed inwardly during a side lateral impact against the door, would curl and be deformed to the phantom line position shown in FIG. 4. However, the addition of the stabilizing strap 85 prevents the flanges 80b and 82b from curling and prevents their deformation to the phantom line position shown in FIG. 4. The flanges 80c and 82c would deform to more or less the dotted line position shown in FIG. 4. The addition of the stabilizing strap 85 thus enhances the structural stability of the beam 76 and increases its load absorption capabilities over and above that which would occur without the addition of the stabilizing strap 85. The stabilizing strap 85 is attached to the U-shaped sections 80 and 82 in the same manner as the stabilizing strap 42 is attached to the beam 40 shown in the FIG. 2 embodiment.

Figure 5:
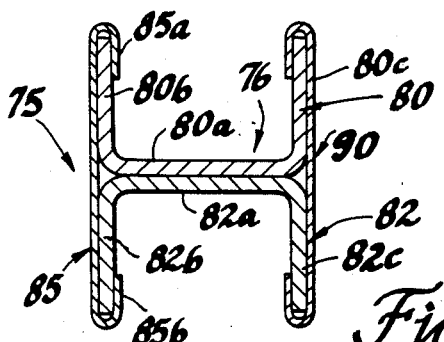
FIG. 5 is an enlarged sectional view of a fourth embodiment of the novel side door impact beam of the present invention; and, FIG. 6 is an enlarged sectional view of a fifth embodiment of the novel side door impact beam of the present invention.

FIG. 5 shows yet another embodiment of the present invention and which is very similar to that shown in FIG. 4. In this embodiment an additional stabilizing strap 90 is placed across and crimped over the backside of the side flange 80c and 82c. Thus, as these flanges 80c and 82c are deformed as the side door impact beam is bowed inwardly due to a side lateral impact on the door assembly 10, they are prevented from curling or folding to the phantom line position shown in FIG. 4 by the addition of the stabilizing strap 90. This further enhances the structural integrity of the beam assembly 75 and enhances its load absorption capabilities.

Figure 6:
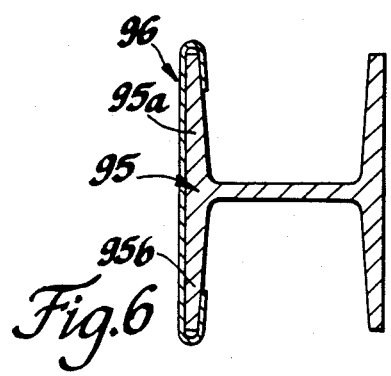

FIG. 6 shows a fifth embodiment of the present invention which is very similar to that shown in FIG. 4, and with the same parts given the same reference numerals. In this embodiment, a one-piece structural I-beam 95 is employed instead of two U-shaped beams welded back to back. The I-beam 95 is made from hot rolled metal, preferably steel or other suitable hot rolled material and has a stabilizing strap 96 secured thereto over its vertically extending flanges 95a and 95b and in the same manner as that previously described in connection with the FIG. 4 embodiment. The beam 95 and strap 96 function in the same manner and achieve the same results as the I-beam assembly 75 previously described in connection with FIG. 4.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. A side door impact beam for use with a vehicle door having inner and outer spaced door panels and fore and aft end walls to define a door well, said impact beam being horizontally disposed within said well and having its opposed ends secured to said door, said impact beam having a main body which is made from metal of a given thickness and which has upper and lower vertically disposed flanges adjacent the outer door panel, the improvement comprising:

a stabilizing strap located adjacent said outer panel and extending laterally across and along said main body a predetermined distance fore and aft of its midpoint, said strap having its upper and lower sides crimped over said upper and lower flanges so as to engage said flanges along their back sides, respectively, said strap being bendable about its neutral axis and slidable relative to said main body during a side impact which causes the main body to be bowed inwardly of the door and functioning to substantially retain and prevent said flanges from deforming inwardly whereby the load bearing ability of the beam is significantly enhanced as compared to an identical impact beam without the stabilizing strap.

2. A side door impact beam for use with a vehicle door having inner and outer spaced door panels and fore and aft end walls to define a door well, said impact beam being horizontally disposed within said well and having its opposed ends secured to said end walls, said impact beam having a main body which is formed from metal material of a given thickness and which comprises a pair of U-shaped channels whose bottoms abut and are welded together to define an I-shaped beam, said beam being oriented so that adjacent side flanges of one of the U-shaped channels are vertically disposed, the improvement comprising:

a stabilizing strap extending along said main body a predetermined distance fore and aft of its midpoint and adjacent the outer panel, said strap having its upper and lower sides crimped over the side flanges of the channel located adjacent the outer door panel so as to engage said flanges along their back sides, said strap being of a lesser thickness than said main body and being bendable about its neutral axis and slidable relative to said main body during a side impact which causes the main body to be bowed inwardly of the door and functioning to substantially retain and prevent said flanges from deforming whereby the load bearing ability of the beam is significantly enhanced as compared to an identical impact beam without the stabilizing strap.

3. A side door impact beam for use with a vehicle door having inner and outer spaced door panels and fore and aft end walls to define a door well, said impact beam being horizontally disposed within said well and having its opposed ends secured to said end walls, said impact beam having a hat shaped main body which is formed from sheet steel of a given thickness and which comprises a U-shaped portion having a bottom, upper and lower sides and upper and lower flanges extending normal to the upper and lower sdies, respectively, and disposed adjacent the outer door panel, said bottom and upper and lower sides defining an opening located adjacent the outer door panel, the improvement comprising:

a stabilizing strap located adjacent said outer panel and extending laterally across said opening and along said main body a predetermined distance fore and aft of its midpoint, said strap having its upper and lower sides crimped over said upper and lower flanges so as to engage said flanges along their back sides, respectively, said strap being of a lesser thickness than said main body and being bendable and slidable relative to said main body during a side impact which causes the main body to be bowed inwardly of the door and functioning to substantially retain and prevent said flanges from deforming inwardly whereby the load bearing ability of the beam is significantly enhanced as compared to an identical impact beam without beam without the stabilizing strap.

4. A side door impact beam, as defined in claims 2 or 3, and wherein the stabilizing strap is tack welded to said beam at only one longitudinal location along said beam.

* * * * *